(12) United States Patent
Ogilvie

(10) Patent No.: US 6,481,410 B1
(45) Date of Patent: Nov. 19, 2002

(54) ROTARY PISTON ENGINE/POSITIVE DISPLACEMENT APPARATUS

(76) Inventor: Brett Robin Ogilvie, 58/64 Storey Road, Logan Village Queensland 4207 (AU)

(*) Notice: Subject to any disclaimer, the term of this patent is extended or adjusted under 35 U.S.C. 154(b) by 0 days.

(21) Appl. No.: 09/786,346

(22) PCT Filed: Jul. 17, 2000

(86) PCT No.: PCT/AU00/00860

§ 371 (c)(1), (2), (4) Date: Mar. 26, 2001

(87) PCT Pub. No.: WO01/06094

PCT Pub. Date: Jan. 25, 2001

(30) Foreign Application Priority Data

Jul. 15, 1999 (AU) .................................... PQ1665

(51) Int. Cl.[7] .................................... F02B 53/00
(52) U.S. Cl. ............. 123/204; 123/246; 123/232; 418/206.6; 418/206.5
(58) Field of Search .................. 123/204, 246, 123/232; 418/191, 206.5, 206.1, 206.4, 196, 206.6

(56) References Cited

U.S. PATENT DOCUMENTS

| | | | | |
|---|---|---|---|---|
| 60,365 A | * | 12/1866 | Hardy | 418/206.5 |
| 660,799 A | * | 10/1900 | Morell | 418/206.6 |
| 713,443 A | * | 11/1902 | Jewell | 418/206.6 |
| 3,862,543 A | * | 1/1975 | Spinnett | 418/196 |
| 3,935,840 A | * | 2/1976 | Fisher | 418/191 |
| 4,003,349 A | * | 1/1977 | Habsburg-Lothringen | 123/246 |
| 4,481,920 A | * | 11/1984 | Carr et al. | 123/246 |
| 4,506,637 A | * | 3/1985 | Reinhold | 123/246 |
| 4,797,077 A | * | 1/1989 | Anderson | 418/206.5 |
| 4,971,002 A | * | 11/1990 | Le | 418/191 |
| 5,222,992 A | * | 6/1993 | Fleischmann | 123/204 |
| 6,062,827 A | * | 5/2000 | Shu | 418/206.1 |
| 6,146,121 A | * | 11/2000 | Fox et al. | 418/206.1 |

FOREIGN PATENT DOCUMENTS

| | | | | |
|---|---|---|---|---|
| DE | 3227024 A1 | 1/1984 | | |
| DE | 4439063 | 7/1995 | | |
| FR | 150332 | * 7/1882 | | 418/206.5 |
| GB | 2170863 A | 8/1986 | | |
| GB | 2313627 A | 12/1997 | | |

* cited by examiner

*Primary Examiner*—Thomas Denion
*Assistant Examiner*—Thai-Ba Trieu
(74) *Attorney, Agent, or Firm*—Hoffman, Wasson & Gitler, PC

(57) ABSTRACT

An engine displacement device including a casing with two internal overlapping rotor chambers, and rotors within the rotor chambers which are arranged to contra rotate to provide internal combustion and/or compression chambers. The casing provides for primary and secondary combustion of a fuel mix, where the device is adapted as a combustion engine.

6 Claims, 4 Drawing Sheets

ROTARY PISTON ENGINE/POSITIVE DISPLACEMENT APPARATUS

TECHNICAL FIELD

This invention relates to apparatus that may be operated as an internal combustion or steam engine, a positive displacement device, or the like.

BACKGROUND ART

There are a number of problems with current piston engine designs which utilise reciprocating components.

In a standard piston engine around 10% of the energy from the fuel goes into accelerating and decelerating the pistons and valves, and friction may reduce available power by a further 2.5%. These are considerable power losses. There is also the problem that much of the energy of the fuel is dissipated down the exhaust pipe.

Concepts such as turbo-charging attempt to utilise this "waste" energy to increase power by increasing the compression. Improvements such as the Miller Cycle have improved efficiencies to some extent by creating an expansion volume which is greater than the compression volume Another problem with piston engines is that much of the force transferred to the crankshaft is at angles less than the most efficient 90 degrees.

In other types of engines such as turbo fan jet engines efficiency is lower than ideal due to the low compression which can be achieved by using a fan rather than a closed displacement chamber.

Current vane type engines also have drawbacks with the complexity of gears and control of the vanes to maintain appropriate contact or sealing, and friction and wear problems due to the large swept area which requires some form of friction seal which causes losses and wear.

Rotary engines based on the Wankel concept have the advantage that moving parts orbit as opposed to reciprocating. The engines are generally lighter more compact and have fewer moving parts than piston engines.

Wankel concept engines have a fixed casing with an internal chamber of a wide-waisted figure of eight and at least one near-triangular rotor. The rotors revolve eccentrically within the casing in such a way that three rotor "tips" are continually in contact with the internal surface of the casing.

Planetary gearing connects the rotor to an output shaft which is equivalent to the crank shaft of a piston engine.

Between the three sides of the rotor and the insides of the casing, chambers are provided, each of which alternatively expands and contracts in size as the rotor orbits. The casing is provided with spark plugs, an inlet port and an exhaust port which are uncovered as the rotor rotates. As a result, a four stroke cycle occurs corresponding to the four stroke cycle of a piston engine, that is, induction, compression, power and exhaust. Efficient seals need to be provided between the rotor tips and the sides of the rotor chamber. The development of effective seals has, to date, been a major problem.

French Patent No. FR 2381908 describes an example of a rotary engine having two "geneva" wheel rotors. The engine has two rotors on parallel shafts. The rotors have recesses and projecting lobes which mesh with each other as the rotors evolve in opposite directions. A small gap between the rotors prevents friction but acts as a labyrinth seal to the escape of gases.

The shafts carry gears which engage with each other to ensure correct contra-rotation of the rotors.

A fuel air mixture is injected through a port in the flank of the engine between the meshing rotors.

A glow plug in the appropriate position ignites the mixture. The resulting expansion produces a force on the lobes of both rotors which causes them to rotate. In the engine described, exhaust gases are released immediately after compression, ignition, and expansion, and the motive forces applied to the arms of the rotors is only over a small segment at rotation.

An object of the present invention is to provide an engine/displacement apparatus of improved mechanical qualities, efficiencies and power.

Further objects and advantages of the present invention will become apparent from the ensuing description.

DISCLOSURE OF THE INVENTION

According to the present invention there is provided a fluid compression and expansion device comprising a casing defining at least two overlapping and substantially disc-shaped internal rotor chambers, bi-axially mounted contra rotating rotors within said internal rotor chambers, each of said rotors having a plurality of radiating rotor arms which mesh in overlapping regions of the internal rotor chambers, the casing provides end walls, and internal rotor chambers perimeter walls, a first side of the internal perimeter wall tracing and conforming to a circular path inscribed by the rotors and a second side perimeter wall having opposed arcuate surfaces which partially trace the circular path inscribed by the rotors joined by a common substantially linear section. The arrangement and construction is such, that on rotation of the rotors, a plurality of compression chambers are provided by the juxtaposed meshed arms of the rotors and the walls of the casing, and enlarged expansion chambers are provided by the juxtapositioned rotors and the second side rotor chamber perimeter walls.

The device can include fuel injection means for injecting a fuel mix into the compression chambers, and fuel igniting means for igniting fuels within the compression chambers.

The rotors can be provided with a hub, arms radiating from the hub each of which have opposed generally involute edges extending to a rotor tip having a arcuate outer edge surfaces.

Each rotor can have three equi-spaced rotor arms radiating from the hub.

Contra-rotation of the rotors can be controlled by meshed gears mounted externally of the casing.

The casing can comprise a pair of end plates to which the rotors are journalled and a central rotor chamber which houses the rotors and to which end plates are fixed.

The rotor outer surfaces enscribe a cylindrical path.

Adjacent walls of the rotor arms may be defined by complimentary volute geometries.

Gearing may be used to increase or vary output speeds.

Where the apparatus is adapted as an engine compression chambers of the engine are split into two and the lateral edges of the rotor arms engage and track along the inner faces of the opposite rotor arms to create high compressions.

Each outer face of the two rotor arms repeats the process in turn creating two compression/combustion areas located between the shafts.

The apparatus has no internal surfaces which maintain contact, hence minimal friction.

Minimal spacing is provided between the surfaces and the rotors and casing.

Sealing may be improved by creating a rolling "air" bearing which maintains containment of the working fluids within the chambers.

Rotor shafts may be supported on the opposite end walls of the casing by bearings. One method may be to use roller bearings to maintain precise tolerance of the apparatus while the standard flat bearings provide support for sideways thrust which is applied.

The rotors are mounted on the shafts and must mesh appropriately in order to provide the sealing and power transfer without friction and wear problems. This could be achieved using a set of gears on rotor shafts, which mesh in such a manner that they can be adjusted to remove any possible backlash and maintain synchronism between the components.

The gears may be housed within the oil sump and may also drive an oil pump if so desired.

The working fluid for an internal combustion engine may be introduced via inlet ports cut into the upper portion of each side of the casing.

The inlet ports should be positioned so that they are closed before the rotors arms begin to intersect, to achieve maximum compression available.

Spent working fluid will be ejected via exhaust ports cut into the lower portion of the casing. The exhaust ports can be positioned parallel to the inlet ports with a small overlap in port opening to allow gas inertia and extraction of clear all exhaust gas and fill the chambers with fresh working fluid.

The exhaust outlets should feed to a common exhaust pipe to aid the gas inertia and extraction of spent working fluid from the chambers.

Other options for improving performance are similar to those currently employed in internal combustion engines include the addition of turbo-super-charging to improve compression etc.

Lubrication can be achieved via an oil pump which moves oil through the rotor shafts to the bearings where it provides lubrication to the bearings. One option for cooling is that the oil on its path through the shaft may travel out through "cross drilled" sections of the vanes near the tips to provide transfer of heat away from the rotor tips. After completing a passage through the shaft and rotors the oil may be run through an oil cooler and back to the sump. Conventional methods of cooling such as a water jacket could also be employed.

BRIEF DESCRIPTION OF THE DRAWINGS

Aspects of the present invention will now be described with reference to the accompanying drawings in which.

BEST METHOD

Figure 1:
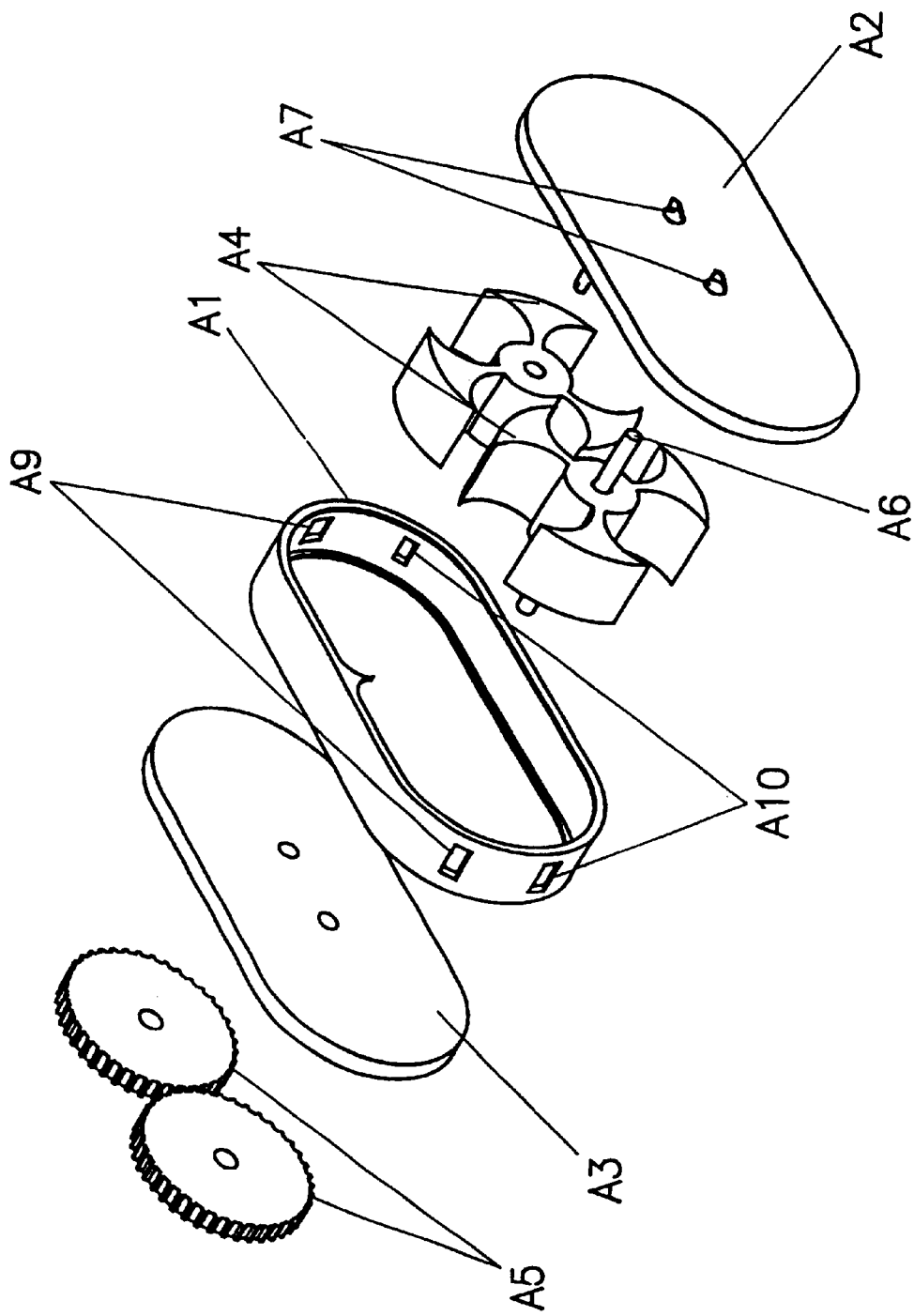
FIG. 1 is an exploded perspective view of apparatus of the present adapted as a rotary engine, and FIG. 2 provides twelve images of the rotors for the engine of FIG. 1 at ten degree intervals.
Figure 2:
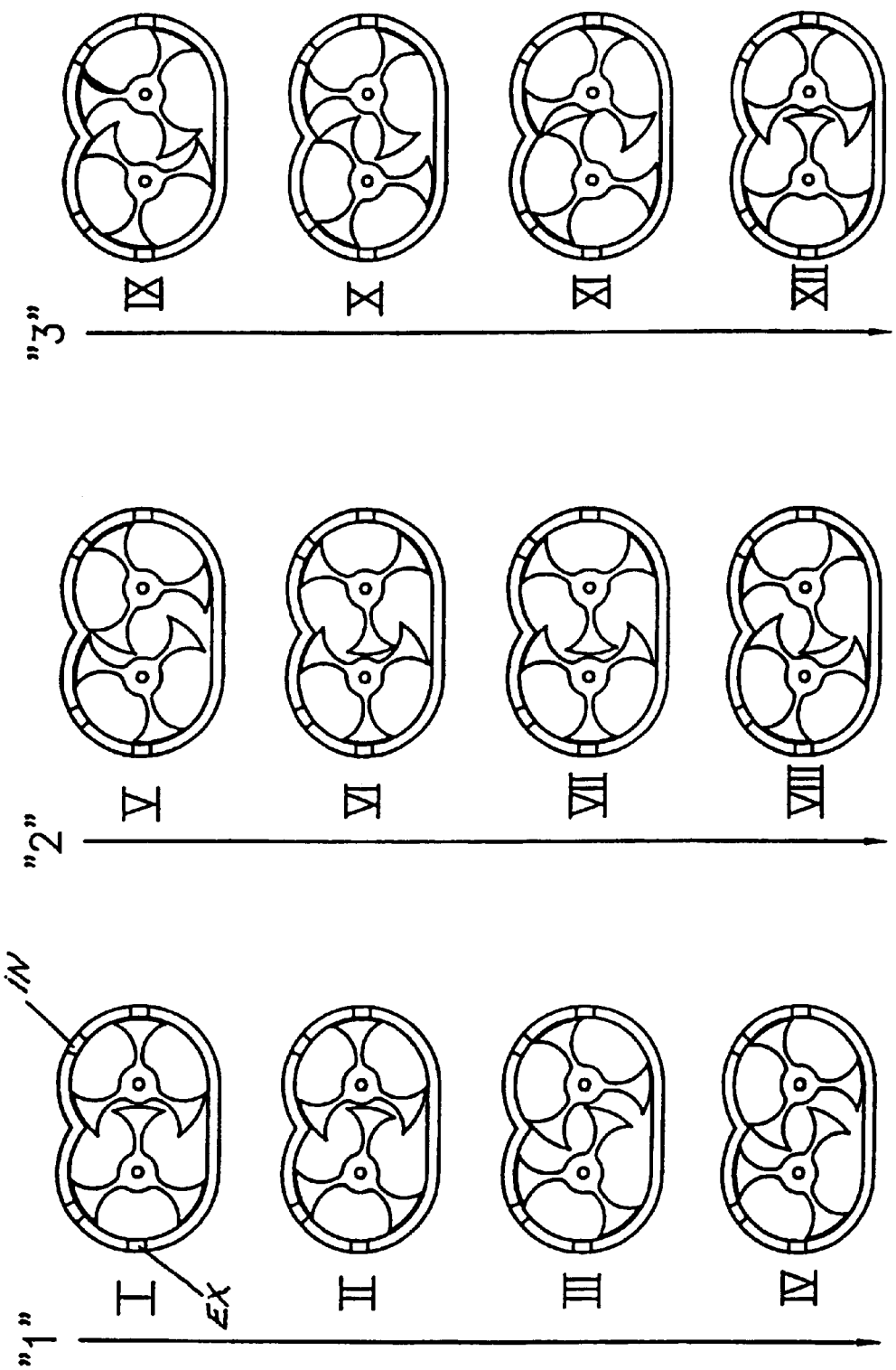

With respect to FIG. 1 of the drawings the apparatus is illustrated is a rotary internal combustion engine having two major rotors each having three arms. The number of rotor arms selected for particular purposes may vary. Major components of the engine illustrated by FIG. 1 are;

A. 1 Main engine case showing shape of case and ports.

A. 2 Front end plate for the engine combustion area.

A. 3 Rear end plate for the engine combustion area.

A. 4 Rotors showing arms.

A. 5 Gears—these may be helical precision ground.

A. 6 Shafts—Gears and Rotors are attached to two power shads.

A. 7 Spark Plugs—shown here to give an insight into the location of combustion chambers at time of firing.

A. 8 Bearing—behind the bearing a set of roller bearings as described earlier can be provided.

A. 9 Inlet ports.

A. 10 Exhaust ports.

Figure 3:
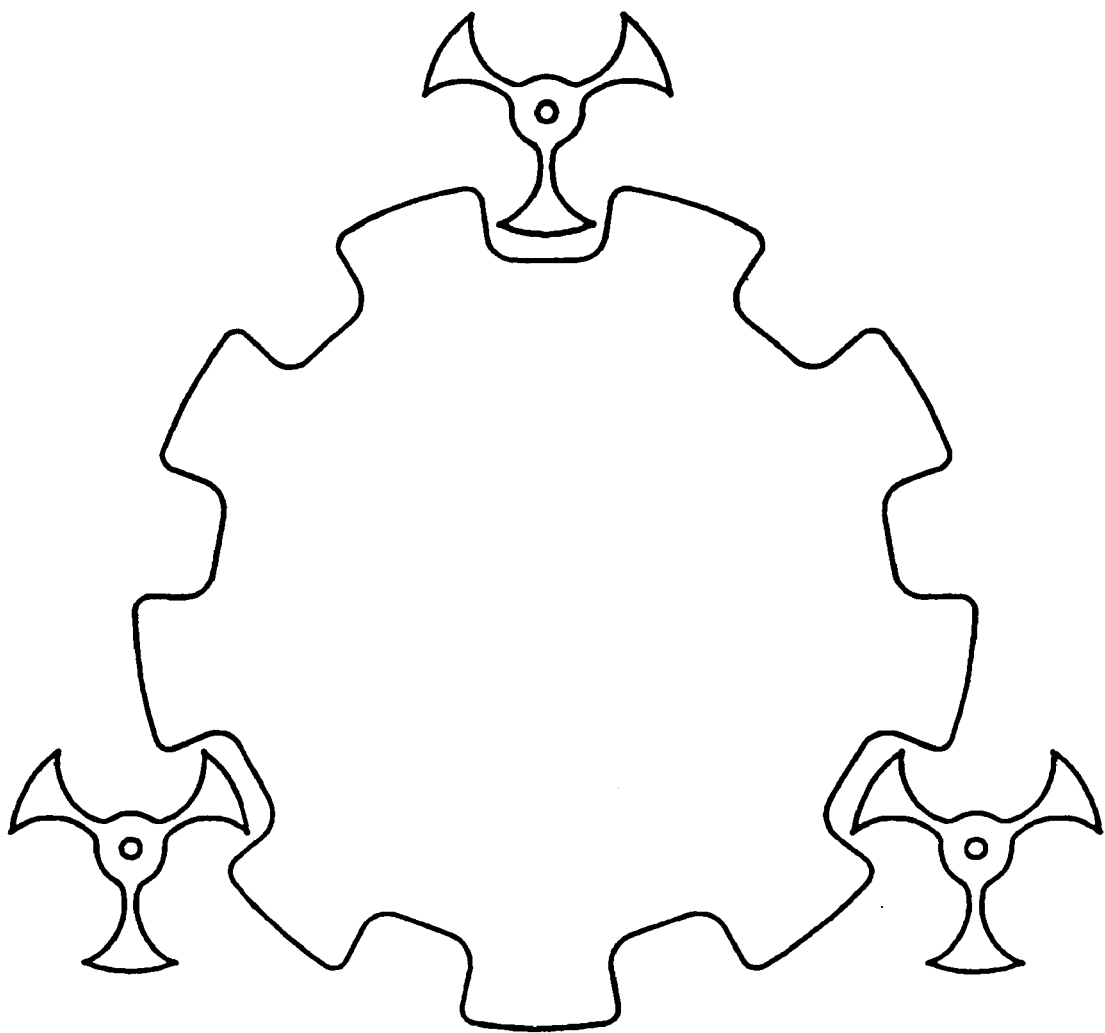
FIG. 3 is an end view of rotor elements of another possible form of apparatus in accordance with the present invention, and FIG. 4 of the drawings shows in an exploded view a further form of the device of the present invention.

With respect to FIG. 3 the progression of the orbit of the engine rotors is shown in three columns "1", "2" and "3". Each image designated I to XII. Fuel inlet and exhaust ports are indicated by the letters IN and EX respectively on the first image.

At I contra rotable rotors have rotor arms AR and AL in a initial overlapping relationship. An injection of fuel can be made behind arm AR.

At II the position of AR is beginning to create a second chamber behind AL.

At III the process continues.

At IV two distinct compression chambers have been formed.

At V a scavenging chamber is formed below AL.

At VI and VII fuel within the compression chamber may be ignited by spark plugs and the expanding fuel creates a multi-directional thrust (a similar situation occurs at top dead centre in piston engine combustion cycles).

At VIII the thrust transfers to AL.

At IX to XII the process continues and the situation illustrated at I is recreated.

FIG. 3 of the drawings shows how apparatus in accordance with the present invention may be varied in form, the instance illustrated showing an apparatus having a large central rotor and a plurality of smaller radially positioned rotors.

Figure 4:
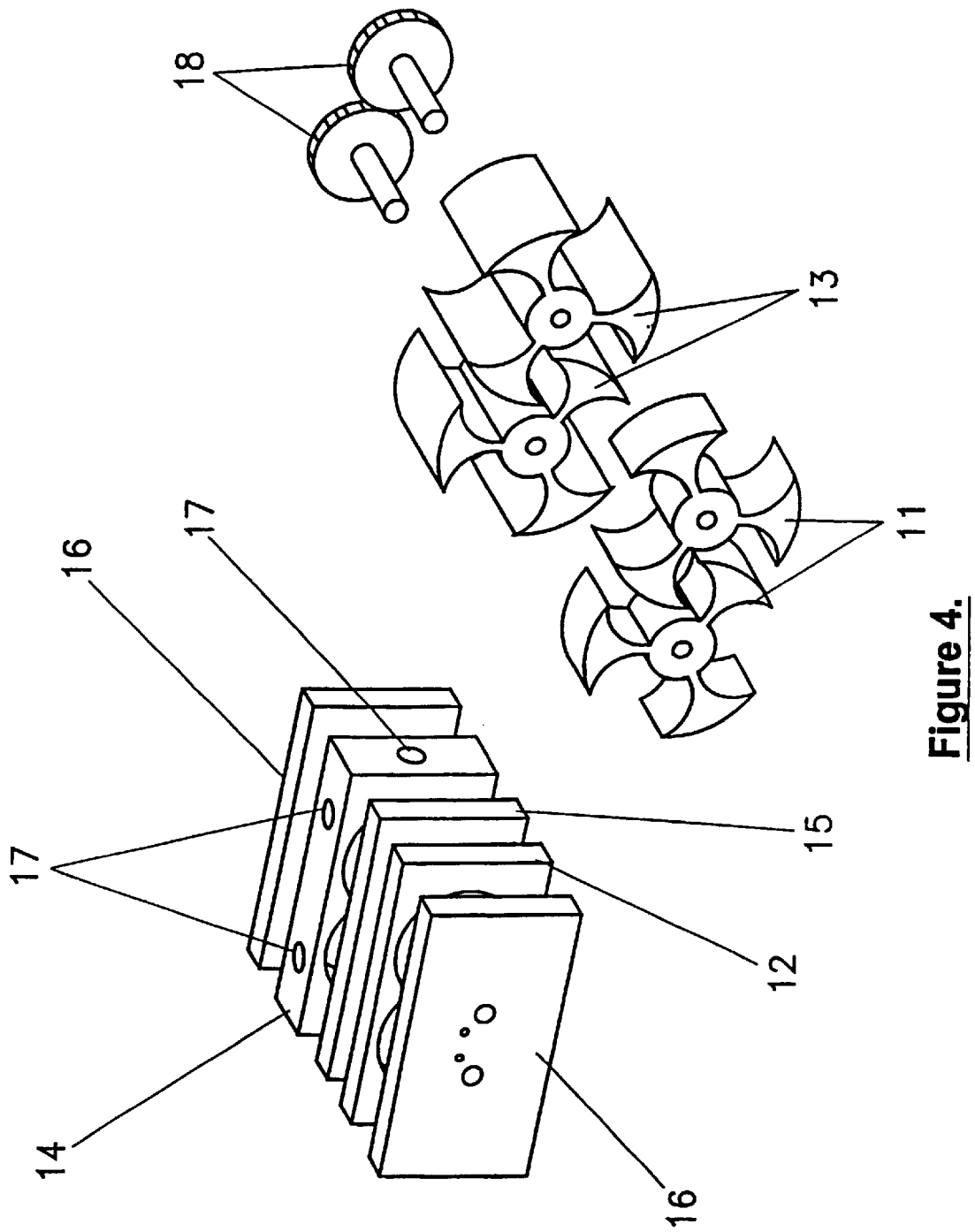

With respect to FIG. 4 of the drawings and in accordance with a further aspect of the present invention the device can comprise a communicable set of rotors and rotor chambers.

A first set of "primary" rotors 11 within an compression and expansion chamber 12 is spaced from a "secondary" set of rotors 13 within a compression and expansion chamber 14 by a wall 15.

The primary and secondary rotor sets 11 and 13 have common shafts (not shown) journalled by end walls 16.

The wall 15 is provided with transfer ports (not shown) to facilitate the transfer of fluids from chamber 12 to chamber 15.

The housing for the chamber 14 is provided with inlet and outlet ports. Gearing 18 ensures that the rotors 11 and 13 can be phased for maximum efficiencies. The rotor 13 can be thirty degrees ahead of the rotors 11. Fuel mixes can be injected into the compression chambers created within housing 12 ignited and exhausted through transfer ports to the compression chambers within housing 14 where secondary ignition can occur.

Because of the nature of my device and the cycle of the device when used as an internal combustion engine and the fact that expanding fluids are released into sealed expansion chamber, a secondary ignition of fuels occurs within the expansion chambers which applies further motive forces to opposite rotor arms in a direction normal to the rotary axis thereof. In effect, the expansion chambers become secondary combustion chambers increasing fuel efficiencies and power remarkably.

Whilst the emphasis of the previous description has been on use of the apparatus of the present invention as a combustion engine it will be appreciated by those skilled in the art that other useful adaptations of the apparatus of the present invention may be made. For example the apparatus may be adapted as a positive displacement variable output pump.

Aspects of the present invention have been described by way of example only and it should be appreciated that modifications and additions may be made thereto without departing from the scope thereof.

What is claimed is:

1. An engine comprising a casing defining at least two overlapping and substantially disc-shaped internal rotor chambers, bi-axially mounted contra rotating rotors within said internal rotor chambers each of said rotors having a plurality of radiating rotor arms which mesh in overlapping regions of the internal rotor chambers, said rotors being provided with a central hub, at least two arms radiating from the hub, each arm having three faces, a head face and two opposed side faces, the opposite side faces being concave arcs which join the convex head face at the outer periphery of the rotor and join the hub at the center, said casing providing end walls, and internal rotor chamber perimeter walls a first side of the internal perimeter wall tracing and conforming to a circular path inscribed by the rotors and a second side perimeter wall having opposed arcuate surfaces which partially trace the circular path inscribed by the rotors joined by a common substantially linear section, the arrangement and construction being such that on rotation of the rotors a plurality of compression chambers are provided by the juxtaposed meshed arms of the rotors and the walls of the casing and an enlarged expansion chambers are provided by the juxtapositioned rotors and the second side rotor chamber perimeter walls, and a plurality of combustion chambers of different volumes provided on the same combustion stroke to allow at least one ignition firing on each combustion stroke.

2. The device as claimed in claim 1 including fuel injection means for injecting a fuel mix into the compression chambers, and fuel igniting means for igniting fuels within the compression chambers.

3. The device as claimed in claim 1, wherein each rotor has three equi-spaced rotor arms radiating from the hub.

4. The device as claimed in claim 1, wherein the contra-rotation of the rotor is controlled by meshed gears mounted externally of the casing.

5. The device as claimed in claim 1, wherein the casing comprises a pair of end plates to which the rotors are journalled and a central rotor chamber which houses the rotors and to which end plates are fixed.

6. The device as claimed in claim 1, wherein upon rotation of the rotors fluids are released from sealed compression chambers and into sealed expansion chambers and, subsequent to further rotation, released from the rotor chambers.

* * * * *